US008871006B2

(12) United States Patent
Brasseur et al.

(10) Patent No.: US 8,871,006 B2
(45) Date of Patent: Oct. 28, 2014

(54) SOLID MINERAL COMPOSITION, METHOD FOR PREPARING SAME AND USE THEREOF FOR REDUCING HEAVY METALS IN FLUE GAS

(75) Inventors: Alain Brasseur, Grace-Hollogne (BE); Jean-Paul Pirard, Liege (BE); Alain Laudet, Namur (BE)

(73) Assignee: S. A. Lhoist Recherche et Developpement, Ottignies-la-Neuve (BE)

( * ) Notice: Subject to any disclaimer, the term of this patent is extended or adjusted under 35 U.S.C. 154(b) by 238 days.

(21) Appl. No.: 13/383,352

(22) PCT Filed: Jul. 13, 2010

(86) PCT No.: PCT/EP2010/060057
§ 371 (c)(1),
(2), (4) Date: Mar. 12, 2012

(87) PCT Pub. No.: WO2011/006890
PCT Pub. Date: Jan. 20, 2011

(65) Prior Publication Data
US 2012/0167762 A1 Jul. 5, 2012

Related U.S. Application Data

(60) Provisional application No. 61/332,256, filed on May 7, 2010.

(30) Foreign Application Priority Data

Jul. 13, 2009 (BE) .................................. 2009/0426

(51) Int. Cl.
*B01D 53/02* (2006.01)
*B01J 20/30* (2006.01)
*B01D 53/64* (2006.01)
*B01J 20/32* (2006.01)
*B01J 20/16* (2006.01)
*B01J 20/04* (2006.01)
*B01J 20/28* (2006.01)

(52) U.S. Cl.
CPC ............. *B01D 53/64* (2013.01); *B01J 20/3078* (2013.01); *B01D 2257/602* (2013.01); *B01D 2251/306* (2013.01); *B01J 2220/42* (2013.01); *B01D 2251/402* (2013.01); *B01J 20/3204* (2013.01); *B01J 2220/56* (2013.01); *B01J 20/165* (2013.01); *B01J 20/041* (2013.01); *B01D 2251/404* (2013.01); *B01D 2251/606* (2013.01); *B01J 20/3236* (2013.01); *B01D 2258/0283* (2013.01); *B01J 20/043* (2013.01); *B01J 20/28004* (2013.01); *B01D 2251/604* (2013.01); *B01J 20/046* (2013.01)
USPC ................ 95/134; 502/80; 502/400; 423/210

(58) Field of Classification Search
CPC ............. B01D 53/64; B01D 2251/402; B01D 2251/404; B01D 2251/604; B01D 2251/606; B01D 2251/306; B01D 2257/602; B01D 2258/0283; B01J 20/041; B01J 20/043; B01J 20/046; B01J 20/165; B01J 20/28004; B01J 20/3078; B01J 20/3204; B01J 20/3236; B01J 2220/42; B01J 2220/56
USPC ........................ 95/134; 502/80, 400; 423/210
See application file for complete search history.

(56) References Cited

U.S. PATENT DOCUMENTS

| 1,907,076 | A | * | 5/1933 | Martin | ........................... 423/267 |
|---|---|---|---|---|---|
| 2,276,503 | A | * | 3/1942 | McHan | ........................... 426/96 |
| 3,345,265 | A | * | 10/1967 | Grodberg et al. | ............. 424/475 |
| 3,576,666 | A | * | 4/1971 | Cutler | ........................... 428/701 |
| 4,094,686 | A | * | 6/1978 | Dubois | ........................... 106/13 |
| 4,158,075 | A | * | 6/1979 | Tanioka et al. | ............... 427/220 |
| 4,447,476 | A | * | 5/1984 | Gattys | ........................... 427/215 |
| 5,792,801 | A | * | 8/1998 | Tsuda et al. | .................. 521/122 |
| 6,582,497 | B1 | | 6/2003 | Maes et al. | |
| 8,216,535 | B2 | | 7/2012 | Pollack et al. | |
| 8,450,232 | B2 | | 5/2013 | Yeh et al. | |
| 8,450,238 | B2 | | 5/2013 | Pollack et al. | |
| 8,715,599 | B2 | | 5/2014 | Pollack et al. | |
| 8,728,974 | B2 | | 5/2014 | Yang et al. | |
| 2006/0016690 | A1 | * | 1/2006 | Ostrovsky | ..................... 205/104 |
| 2007/0140940 | A1 | | 6/2007 | Varma et al. | |
| 2007/0267343 | A1 | | 11/2007 | Forrester | |
| 2008/0028932 | A1 | | 2/2008 | Biermann et al. | |
| 2009/0136401 | A1 | | 5/2009 | Yang et al. | |

FOREIGN PATENT DOCUMENTS

WO 2007053786 A1 5/2007

* cited by examiner

*Primary Examiner* — Christopher P Jones
(74) *Attorney, Agent, or Firm* — Charles D. Gunter, Jr.

(57) ABSTRACT

The invention relates to a solid mineral composition of heavy metals, in particular mercury, in flue gas, to a method for preparing such a solid mineral compound and to the use thereof for reducing heavy metals, in particular mercury, in flue gas, by placing the flue gas in contact with the solid mineral composition.

19 Claims, No Drawings

SOLID MINERAL COMPOSITION, METHOD FOR PREPARING SAME AND USE THEREOF FOR REDUCING HEAVY METALS IN FLUE GAS

The present invention relates to a composition for reducing heavy metals in flue gases comprising a mineral compound.

Heavy metals, notably mercury, are toxic compounds, present in flue gases, notably in the gas state and the emission of which is generally strictly regulated. By the terms of "heavy metals", are mainly meant metals having a density of more than 5,000 kg/m$^3$, notably the most common heavy metals, generally being the subject of regulations, i.e. lead, chromium, copper, manganese, antimony, arsenic, cobalt, nickel, vanadium, cadmium, thallium and mercury, preferably lead, thallium, cadmium and mercury, in particular mercury. These metals may appear in the elementary state or in ionic form.

The reduction of heavy metals present in flue gases is generally performed in the state of the art by means of carbonaceous compounds, such as active carbons, lignite cokes or the like. The selection of the type(s) of carbonaceous compounds notably depends on the regulatory values which should not be exceeded for these types of pollutants.

In many situations, in the case of waste incineration units, the initial emissions of certain heavy metals exceed, sometimes by far, that of the regulations in effect, so that it is absolutely necessary to reduce, sometimes considerably, these pollutants. A carbonaceous compound may be applied either as such, or in a mixture with a basic reagent, in a fixed bed in granular form or by injection into the gas in powdery form; the solid particles are then trapped downstream, for example in a textile filter, where their action is prolonged.

The efficiency of carbonaceous compounds for reducing heavy metals is unanimously recognized. Nevertheless, the use of these carbonaceous compounds in flue gases has two major drawbacks:
the increase in the total organic carbon content in the dusts present at the discharge of these flue gases, a carbon content which is strictly regulated;
the risk of flammability, all the greater since the temperature of the gases to be purified is high.

An improvement provided by one skilled in the art for solving the problems of ignition of the carbonaceous compounds was to use them in a mixture with uninflammable substances, such as lime. Unfortunately, this improvement actually reduced the risks of ignition of the carbonaceous compounds but did not completely suppress them. Indeed, hot spots may still appear, even at low temperature (for example 150° C.), notably in the presence of infiltration of air into areas where the carbonaceous compounds are subject to accumulation.

For example, document U.S. Pat. No. 6,582,497 discloses a mixture of alkaline compound, of coal or coal impregnated with a halogenated compound, for reducing mercury in flue gases. However, this document does not give any information as to the possible doping of mineral compounds as well as their effect on the reduction of mercury of flue gases.

Document US 2008/028932 presents the use of oxidants, preferably calcium hyperchlorite in order to improve mercury reduction of gas streams. Calcium hyperchlorite is added upstream from the adsorbent injection and reacts with the latter. However, it is known that calcium hyperchlorite is a corrosive, oxidizing and dangerous compound for the environment, which makes its use a problem.

Finally document WO 2007/053786 describes the use of chloride or other oxidizers, added with the coal before the combustion, which causes oxidation of the mercury into a salt and facilitates its subsequent capture.

Carbonaceous compounds are generally costly compounds and the step applying said carbonaceous compounds is difficult to integrate into a complete method for treating flue gases, which often has to also remove nitrogen-containing pollutants. The removal of nitrogen oxides via a catalytic route is generally practiced at a gas temperature above 200° C., at which the carbonaceous compounds may burn in the presence of oxygen. For good compatibility with a step of the method using carbonaceous compounds, the cooling of the flue gases and the heating of the latter has to be alternated. This represents a significant energy loss and overcost. It is therefore difficult to integrate carbonaceous compounds in a method for treating flue gases, given the ignition problems caused by these compounds.

Documents "ES 8704428" or "ES 2136496", and "GIL, ISABEL GUIJARRO; ECHEVERRIA, SAGRARIO MENDIOROZ; MARTIN-LAZARO, PEDRO JUAN BERMEJO; ANDRES, VICENTA MUNOZ, Mercury removal from gaseous streams. Effects of adsorbent geometry, Revista de la Real Academia de Ciencias Exactas, Fisicas y Naturales (Spain) (1996), 90 (3), pp 197-204" mention that it is possible to do without carbon for reducing heavy metals, in particular mercury, by using sulfur as a reagent. The sulfur is deposited on a mineral support, such as natural silicates. Such formulations thus overcome the aforementioned drawbacks of carbonaceous compounds. In this case, the silicate is considered as an inert support relatively to the pollutant to be reduced; the latter is trapped by reaction with the sulfur-containing compound so as to generally form a sulfide.

Unfortunately, silicates functionalized by sulfur-containing compounds are subject to dangerous, burdensome and costly manufacturing which is a penalty to their use. For example, document ES 8704428 discloses sulfurization of a silicate by an oxidation reaction of hydrogen sulfide at a well defined molar proportion with the purpose of adsorbing elementary sulfur on said silicate. The handling of hydrogen sulfide, which is highly toxic and extremely flammable, is dangerous and the required strict molar proportion in order to avoid any subsequent oxidation reaction is very restrictive. Document "ES 2136496" provides a similar teaching, describing a method for sulfurization of natural silicates for retaining metal vapors.

Another example is described in document US 2007/0267343 which provides the capture of heavy metal particles in an aqueous phase in the presence of a complexing compound, preferably a phosphorus-containing compound and in particular a phosphate. In this way, a complex is formed between the phosphate and the metal to be captured in the aqueous phase which has not very high solubility and reduces the release of the metal in natural or induced leaching processes, and/or in digestion processes in humans or animals. The aqueous phase in which the complexation reaction occurs, is therefore essential and this method only seems to be applicable with difficulty to the mass reduction of mercury in flue gases by a powdery compound.

Patent EP1732668 B1 provides the use of non-functionalized mineral compounds, notably halloysite for reducing heavy metals, in particular mercury. However, the efficiency of halloysite for reducing mercury seems to be limited, as compared with active carbons, a priori causing an overdose. Moreover, the reduction of heavy metals by non-functionalized mineral compounds, such as halloysite is carried out by (exothermic) adsorption, therefore with an efficiency which decreases when the temperature increases.

The object of the invention is to find a remedy to the drawbacks of the prior art, by providing a composition as mentioned at the beginning which is solid wherein said mineral compound is doped with a halide salt, i.e., for which the surface accessible to flue gases is partly or completely covered with a halide salt, and is selected from the group consisting of halloysite, calcium or magnesium carbonates or hydroxides and sodium carbonates as well as mixtures and derivatives thereof.

Indeed, it was unexpectedly observed and in an unpredictable way that this mineral compound doped with a halide in the form of a salt allowed highly efficient reduction, in a wide temperature range, of heavy metals, notably in the gas state, present in flue gases, by using an entirely mineral solid compound, the manufacturing and the application of which are simple and not dangerous.

The effect of this composition according to the invention on the reduction rate of heavy metals is particularly unexpected since the reduction performances of the doped mineral compound are disproportionate with those of the non-doped mineral compound. Thus certain solid mineral materials which do not have any notable capacity of reducing heavy metals in the non-doped state and in particular which do not have any significant porosity, such as for example, slaked lime, have after doping with a halide salt according to the invention, heavy metal reduction capacities which may be widely greater than those of many carbonaceous compounds, although well known to be most adapted to the reduction of heavy metals. Moreover, solid mineral materials already having propensity for reducing heavy metals, in particular mercury such as halloysite may see their reduction capacity be increased tenfold, several times, after doping with a halide salt according to the invention.

The mineral compound according to the invention therefore comprises a mineral support, notably without any known capacity for reducing heavy metals, associated with a halide dopant as a salt.

The mineral compound according to the invention may therefore be slaked lime, dolomite, limestone and/or halloysite, as an example.

By "mineral compound doped with a halide salt" is meant a mineral compound selected from the group consisting of halloysite, calcium or magnesium carbonates or hydroxides and sodium carbonates as well as mixtures and derivatives thereof, for which the surface accessible to flue gases is partly or completely covered with a halide salt.

The surface accessible to the gas not only comprises the external surface of the constitutive particles of the mineral solid but also a portion or the whole of the internal surface of these partly porous particles.

In an advantageous embodiment, said halide salt is an inorganic halide salt, so as to not to introduce additional carbonaceous compounds into the flue gases.

The mineral compound doped with a halide salt contains, on a dry basis, from 0.5% to 20%, preferably from 1% to 15%, in particular, from 1.5% to 10% by weight of halide salt based on the weight of the composition according to the invention. The halide salt may be an alkaline or alkaline-earth halide, notably NaCl, NaBr or NaI, KCl, KBr or KI, $CaCl_2$, $CaBr_2$ or $CaCl_2$, $MgCl_2$, $MgBr_2$ or $MgI_2$, or else $NH_4Cl$, $NH_4Br$ or $NH_4I$ or one of their mixtures.

Advantageously, the mineral compound according to the invention is in powdery form, i.e. the particle size is essentially greater than 1 μm, and in majority (more than 90%) smaller than 1 mm, i.e. they have a $d_{90}$ of less than 1 mm.

By $d_{90}$ is meant the interpolated value of the distribution curve of the particle sizes, such that 90% of the particles have a size below said value.

Unexpectedly, it was possible to show that these mineral compounds, thereby doped with a halide salt give the possibility of reducing with very high efficiency, heavy metals, notably in the gas state, in particular mercury and most particularly metallic mercury $Hg^0$, in flue gases.

Other embodiments of the product according to the invention are indicated in the appended claims.

An object of the present invention is also a method for preparing a mineral solid composition according to the invention. This method comprises the steps of:

supplying a mineral compound selected from the group consisting of halloysite and of calcium or magnesium carbonates or hydroxides and sodium carbonates as well as mixtures thereof, supplying a halide salt, and putting into contact said mineral compound and said halide salt with formation of a mineral compound doped with the halide salt.

Advantageously, said putting into contact of said mineral compound and of said halide salt is achieved with stirring.

As mentioned earlier, preferably in the method according to the invention, the mineral solid material is selected from the group formed by slaked lime, dolomite, limestone and/or halloysite.

Preferably, the supplied mineral compound has a humidity comprised between 0.1 and 100 g/kg, advantageously between 2 and 90 g/kg.

Advantageously, said contacting is achieved at room temperature.

In a preferential embodiment of the method according to the invention, said halide salt is in liquid form, in an aqueous phase.

Further, said step for putting into contact said mineral compound and said halide salt is advantageously spraying of said halide salt on said mineral compound, optionally in the presence of stirring.

In an alternative preferential embodiment of the method according to the invention, said step for putting into contact said mineral compound and said halide salt is a soaking operation in one or several steps, optionally with stirring and optionally with intermediate drying steps for said mineral compound in said halide salt in a liquid phase.

Preferably, said halide salt in a liquid phase is an aqueous solution having a halide salt content comprised between 1% and the salt saturation of the solution, notably between 1% and 35%, in particular between 5% and 27%, preferably between 10% and 27% by weight, based on the total weight of said solution. It should be noted that a low salt concentration in the solution leads to a more difficult application of the mixture as well as to more expensive subsequent drying. Moreover, the concentration of the solution is limited by the solubility of the salt. The putting into contact of the halide salt and of the mineral compound is performed so as to promote a distribution as homogeneous as possible of the halide salt on the accessible external, but also internal, surface of the mineral compound.

Advantageously, the method according to the invention further comprises a step for drying and/or deagglomerating said mineral compound doped with the halide salt, preferably according to operating conditions (ambient temperature, dwelling time . . . ) such that the doped mineral compound reaches a temperature comprised between 60 and 200° C., in particular between 75 and 170° C., with view to attaining a residual humidity preferably less than 100 g/kg, advantageously less than 50 g/kg.

As mentioned earlier, preferably, in the method according to the invention, said halide is an alkaline halide, an alkaline-earth halide or the like, preferably selected from the group consisting of NaCl, NaBr, NaI, KCl, KBr, KI, $CaCl_2$, $CaBr_2$, $CaI_2$, $MgCl_2$, $MgBr_2$, $MgI_2$, $NH_4Cl$, $NH_4Br$ or $NH_4I$ or mixtures thereof.

Other embodiments of the method according to the invention are indicated in the appended claims.

The present invention further relates to a use of a mineral compound as described above for reducing heavy metals, notably in the gas state, in particular mercury and most particularly metallic mercury $Hg^0$, present in flue gases, by putting the flue gases into contact with the aforementioned solid mineral composition and to a use of a mixture of a basic reagent and of said solid mineral composition for treating the flue gases.

The mineral compound doped according to the invention is therefore put into contact with the flue gas to be treated, either as such, or in association with another solid material, in particular in a mixture with a basic agent currently used for reducing acid gases from flue gases, such as lime or the like.

Consequently, the application of the solid mineral composition according to the invention only requires that a preferably dry simple-to-use product be obtained.

The use of the mineral compound doped according to the invention for reducing heavy metals therefore comprises putting into contact said doped mineral compounds, preferably in the dry state, carried out at a temperature comprised in the range from 70 to 350° C., notably between 110 and 300° C. and more preferentially between 120 and 250° C. The possibility of working at temperatures close to or greater than 200° C., inter alia for the contacting, at a relatively constant temperature to be maintained all along the method for treating flue gases and the consecutive cooling and heating steps for removing the heavy metals and then that of the nitrogen-containing compounds by catalysis may be avoided or limited.

Advantageously, the mineral compound according to the invention is used in powdery form, i.e. the particle size is in majority (more than 90%) smaller than 1 mm ($d_{90}$ smaller than 1 mm) and essentially greater than 1 µm. The mineral compound is then injected pneumatically into the gas vein.

The use of the mineral compound doped according to the invention for reducing heavy metals in flue gases is often to be integrated in a complete treatment of flue gases. Such a treatment comprises a step for removing the majority acid pollutants by putting said flue gases into contact with basic reagents. Generally, the majority acid pollutants in the flue gases comprise hydrochloric, hydrofluoric acids, sulfur oxides or further nitrogen oxides, their contents upon emission in flue gases before treatment are of the order of several tens to several hundred $mg/Nm^3$.

When the use of the mineral compound doped according to the invention for reducing heavy metals in flue gases is integrated into a complete treatment of flue gases, basic reagents, for example, lime, and said doped mineral compound are applied separately or as a mixture. The latter case allows a gain in investment and space, since consequently two steps may be carried out simultaneously and in the same location.

Other uses according to the invention are mentioned in the appended claims.

Other features, details and advantages of the invention will become apparent from the description given hereafter, in a non-limiting way and with reference to the examples.

The invention will now be described in more details by means of non-limiting examples.

Examples 1 to 9 and the Comparative Example are laboratory-scale tests, according to the following experimental procedure. About 100 mg of mineral compound doped with a halide salt (Examples 1 to 9, according to the invention) or non-doped (Comparative Example) are placed in the centre of a cylindrical reactor with a length of 110 mm and an inner diameter of 10 mm so as to form a homogeneous bed on rock wool. A nitrogen stream containing 600 µg/$Nm^3$ of metallic mercury)($Hg^0$, with a total flow rate of 2.8 $10^{-6}$ $Nm^3$/s crosses this bed. With a VM-3000 detector from Mercury Instruments, it is possible to measure the metallic mercury level at the outlet of the reactor. Prior to its arrival at the detector, the gas crosses a solution of $SnCl_2$, so as to convert into metallic mercury the possible fraction of mercury present in ionic form. In this way, the totality of the mercury is measured. With this device, it is possible to evaluate the capacity of mercury reduction by a solid by applying the principle of the breakthrough curve. The reduction capacity is expressed in (µg Hg)/g of solid. Tables 1 and 2 summarize the preparation methods and the mercury reduction performances for Examples 1 to 7 and the Comparative Example.

COMPARATIVE EXAMPLE

Commercially available halloysite or lime are placed in the reactor described above. A breakthrough curve is achieved at a set temperature of 130° C. The mercury reduction capacity of this conventional halloysite and this conventional lime, non-doped in the device described earlier is respectively 40 (µg Hg)/g of halloysite and 1 (µg Hg)/g of lime.

Example 1

According to the invention, soaking of halloysite and of lime like those of the Comparative Example is achieved. This soaking is achieved by respectively immersing halloysite and lime in an aqueous solution with a KBr content of 10% by weight, based on the weight of the aqueous solution. The thereby doped humid halloysite and humid lime are dried and deagglomerated, at a temperature of 75° C. in an oven, so as to attain a residual humidity of less than 50 g/kg. The amount of KBr deposited on the halloysite and on the lime after drying is 10% by weight based on the weight of the obtained composition according to the invention. The mercury reduction capacity of this halloysite and of this lime doped with KBr according to the invention in the device described earlier and operating under the same operating conditions as in the Comparative Example, is 486 (µg Hg)/g of doped halloysite and 24 (µg Hg)/g of doped lime, respectively.

TABLE 1

Summary of the laboratory tests - lime

|  | Example | |
|---|---|---|
|  | Comparative | 1 |
| Additive | none | KBr |
| Initial solution | — | 10% |
| Doping method | — | Soaking |
| Humidity after impregnation | — | 50% |
| Drying temperature | — | 75° C. |
| Impregnated additive level | — | 10% |
| Mercury reduction (µg Hg/g) | 1 | 24 |

Example 2

Spraying of a halloysite similar to the one of the Comparative Example is achieved according to the invention. Spraying is achieved from an aqueous solution with a KBr content of 27% by weight based on the weight of the aqueous solution. The solution is sprayed on the halloysite with mechanical stirring, until a humidity of 20% is obtained. The thereby doped humid halloysite is dried and deagglomerated, at a temperature of 150° C. in an oven, so as to attain a residual humidity of less than 50 g/kg. The amount of KBr deposited on the halloysite after drying is 6% expressed by weight based on the weight of the composition. The mercury reduction capacity of this KBr-doped halloysite is equal to 198 (µg Hg)/g of doped halloysite.

Example 3

Example 2 is reproduced but with a solution of 27% by weight of $MgCl_2$, based on the weight of the aqueous solution. The solution is sprayed on halloysite with mechanical stirring, until a humidity of 15% is obtained. The amount of $MgCl_2$ deposited on the halloysite after drying is 6% expressed by weight, based on the weight of the composition. The measured mercury reduction capacity is equal to 326 (µg Hg)/g of doped halloysite.

Example 4

Example 2 is reproduced but with a solution of 27% by weight of $MgBr_2$, based on the weight of the aqueous solution. The solution is sprayed on the halloysite with mechanical stirring, until a humidity of 15% is obtained. The amount of $MgBr_2$ deposited on the halloysite after drying is 6% expressed by weight, based on the weight of the composition. The measured mercury reduction capacity is equal to 3140 (µg Hg)/g of doped halloysite.

Example 5

Example 2 is reproduced but with a solution with 27% by weight of $CaCl_2$, based on the weight of the aqueous solution. The solution is sprayed on the halloysite with mechanical stirring, until a humidity of 17% is obtained. The amount of $CaCl_2$ deposited on the halloysite after drying is 6% expressed by weight, based on the weight of the composition. The measured mercury reduction capacity is equal to 215 (µg Hg)/g of doped halloysite.

Example 6

Example 2 is reproduced but with a solution with 27% by weight of $CaBr_2$ based on the weight of the aqueous solution. The solution is sprayed on the halloysite with mechanical stirring, until a humidity of 15% is obtained. The amount of $CaBr_2$ deposited on the halloysite after drying is 6% expressed by weight based on the weight of the composition. The measured mercury reduction capacity is equal to 447 (µg Hg)/g of doped halloysite.

Example 7

Example 2 is reproduced but with a solution of 9% by weight of $NH_4I$ based on the weight of the aqueous solution. The solution is sprayed on the halloysite with mechanical stirring until a humidity of 16% is obtained. The amount of $NH_4I$ deposited on the halloysite after drying is 2% expressed by weight based on the weight of the composition. The measured mercury reduction capacity is equal to 1940 (µg Hg)/g of doped halloysite

TABLE 2

Summary of the laboratory tests - halloysite

| | Comparative | 1 | 2 | 3 | 4 | 5 | 6 | 7 |
|---|---|---|---|---|---|---|---|---|
| Additive | None | KBr | KBr | $MgCl_2$ | $MgBr_2$ | $CaCl_2$ | $CaBr_2$ | $NH_4I$ |
| Initial solution | — | 10% | 27% | 27% | 27% | 27% | 27% | 9% |
| Doping method | — | Soaking | Spray. | Spray. | Spray. | Spray. | Spray. | Spray. |
| Humidity after impregnation | — | 50% | 20% | 15% | 15% | 17% | 15% | 16% |
| Drying temperature | — | 75° C. | 150° C. | 150° C. | 150° C. | 150° C. | 150° C. | 150° C. |
| Impregnated additive level | — | 10% | 6% | 6% | 6% | 6% | 6.5% | 2% |
| Mercury reduction (µg Hg)/g | 40 | 486 | 198 | 326 | 3140 | 215 | 447 | 1940 |

Example 8

Effect of the Concentration of the Doping Solution

Example 2 is repeated by impregnating 4 halloysite samples similar to that of the Comparative Example by spraying with $MgBr_2$ solutions with a concentration respectively having the value of 5%, 9%, 27%, 35% in order to obtain a deposited additive content of 1%, 2% 6% and 10%, respectively. The impregnated halloysite is placed in a reactor maintained at a set temperature of 130° C. The mercury reduction capacity is 509, 905, 3140, 3980 (µg Hg)/g of halloysite under the test conditions, respectively. A significant increase in the mercury reduction is therefore observed for an increasing halide concentration of the doped halloysite.

Example 9

Influence of the Temperature of the Reactor

Example 2 is reproduced but with a solution of 27% by weight of $CaBr_2$ based on the weight of the aqueous solution.

The amount of CaBr$_2$ deposited on the halloysite after drying is 1.2% expressed by weight based on the weight of the composition. A breakthrough curve is produced at set temperatures of 130° C., 200° C., 250° C. and 300° C.

The measured mercury reduction capacity is respectively equal to 367, 829, 926 and 848 (µg Hg)/g of doped halloysite under the test conditions. These results show the advantageous use of the doped composition according to the invention, notably between 200° C. and 300° C.

Example 10

Industrial Scale

According to the invention, halloysite similar to that of the Comparative Example is doped by spraying in an industrial mixer. For this purpose, an aqueous solution with a KBr content of 25% by weight based on the weight of the aqueous solution is sprayed. The flow rate of doped halloysite, with 18% humidity, is 200 kg/h. The latter is deagglomerated and dried in a cage mill/dryer, by means of hot gases at about 400-450° C. and a dwelling time such that the gases flow out of the mill/dryer at about 150° C. A dried halloysite according to the invention with 10% by weight of KBr, based on the weight of the composition, is obtained.

The thereby doped halloysite is used in a line for treating flue gases having a flow rate of about 150,000 Nm$^3$/h stemming from the recycling of non-ferrous metals. The doped halloysite is metered by means of a screw and pneumatically injected into the gas stream at 170° C. in an amount of 60 kg/h, and then collected in a sleeve filter, notably with combustion dusts.

The mercury concentrations were measured upstream from the point of injection of the doped halloysite and downstream from the sleeve filter by atomic absorption (MERCEM from Sick-Maihak). The measured concentrations, normalized on dry gases and referred to 20% of oxygen are:

87 µg/Nm$^3$ upstream and

13 µg/Nm$^3$ downstream. This result shows a mercury reduction rate of 85%.

Example 11

Industrial Scale

The doped halloysite of Example 11 is used in a line for treating flue gases having a flow rate of about 20,000 Nm$^3$/h stemming from the recycling of non-ferrous metals. The doped halloysite is metered by means of a screw and pneumatically injected into the gas stream at 70° C. in an amount of 30 kg/h, and then collected in a sleeve filter, notably with the combustion dusts.

The mercury concentrations were measured upstream from the point of injection of the doped halloysite and downstream from the sleeve filter by atomic absorption. The measured concentrations normalized on dry gas and referred to 21% of oxygen are:

450 µg/Nm$^3$ upstream, and

30 µg/Nm$^3$ downstream. This result is less than the 50 µg/Nm$^3$ of the regulations in effect and shows a mercury reduction rate of 93%.

It should be understood that the present invention is by no means limited to the embodiments described above and that many modifications may be made thereto without departing from the scope of the appended claims.

The invention claimed is:

1. A solid composition for reducing heavy metals in flue gases comprising a mineral compound, non-functionalized, doped with a halide salt, i.e., for which the surface accessible to flue gases is partly or completely covered with a halide salt, said mineral compound being selected from the group consisting of halloysite, calcium or magnesium hydroxides as well as of mixtures and derivatives thereof, said halide salt being present in an amount on a dry basis ranging from 0.5% to 20% by weight on the basis of the weight of the composition.

2. The composition according to claim 1, wherein said halide salt is an inorganic halide salt.

3. The composition according to claim 1, wherein said mineral compound is preferably selected from the group consisting of halloysite and calcium hydroxide as well as mixtures thereof.

4. The composition according to claim 1, wherein said halide salt is present in an amount on a dry basis ranging from 1% to 15% by weight of halide salt on the basis of the weight of the composition.

5. The composition according to claim 1, wherein said halide salt is an alkaline halide, an alkaline-earth halide or mixtures thereof.

6. The composition according to claim 1, wherein the mineral compound is in powdery form and has a d$_{90}$ of less than 1 mm and in particular a particle size comprised between 1 µm and 1 mm.

7. The composition according to claim 1, wherein said halide salt is present in an amount on a dry basis ranging from 1.5% to 10% by weight of halide salt on the basis of the weight of the composition.

8. The composition according to claim 1, wherein the calcium hydroxide is slaked lime.

9. The composition according to claim 5, wherein said halide salt is selected from the group consisting of NaCl, NaBr, NaI, KCl, KBr, KI, CaCl$_2$, CaBr$_2$, CaI$_2$, MgCl$_2$, MgBr$_2$, MgI$_2$, NH$_4$Cl, NH$_4$Br or NH$_4$I or mixtures thereof.

10. A method for preparing a composition for reducing heavy metals in flue gases according to claim 1, comprising the steps:

supplying a mineral compound selected from the group consisting of halloysite, calcium or magnesium hydroxides, as well as mixtures thereof, supplying a halide salt, and putting into contact said mineral compound and said halide salt with formation of a mineral compound doped with the halide salt.

11. The method according to claim 10, wherein said putting into contact of said mineral compound and of said halide salt is achieved with stirring.

12. The method according to claim 10 wherein said supplied mineral compound has a humidity comprised between 0.1 and 100 g/kg, advantageously between 2 and 90 g/kg.

13. The method according to claim 10, wherein said putting into contact is carried out at room temperature.

14. The method according to claim 10, wherein said halide salt is in liquid form, in an aqueous phase.

15. The method according to claim 14 wherein said halide salt in a liquid from has a halide salt content comprised between 1% and the salt saturation of the solution, notably between 1% and 35%, preferably between 5% and 27% by weight based on the total weight of said solution.

16. The method according to claim 10, wherein said step for putting into contact said mineral compound and said halide salt is spraying of said halide salt on said mineral compound.

17. The method according to claim 10, wherein said step for putting into contact said mineral compound and said halide salt is soaking of said mineral compound in said halide salt in a liquid phase.

18. The method according to claim 10, further comprising a step for drying and/or deagglomerating said mineral compound doped with the halide salt, preferably at a temperature comprised between 60 and 200° C., in particular between 75 and 170° C.

19. The method according to claim 10, wherein said halide salt is an alkaline halide, an alkaline-earth halide or the like, preferably selected from the group consisting of NaCl, NaBr, NaI, KCl, KBr, KI, $CaCl_2$, $CaBr_2$, $CaI_2$, $MgCl_2$, $MgBr_2$, $MgI_2$, $NH_4Cl$, $NH_4Br$ or $NH_4I$ or mixtures thereof.

* * * * *